United States Patent Office 3,509,114
Patented Apr. 28, 1970

3,509,114
PROCESS FOR POLYMERIZATION OF WATER-SOLUBLE ACRYLIC MONOMERS
Donald E. Ballast, Midland, Mich., assignor to The Dow Chemical Company, Midland, Mich., a corporation of Delaware
No Drawing. Filed Oct. 28, 1966, Ser. No. 590,199
Int. Cl. C08f 3/90, 15/00
U.S. Cl. 260—80                                    5 Claims

ABSTRACT OF THE DISCLOSURE

In the polymerization of water-soluble acrylic monomers in aqueous solution, increased rates of polymerization are obtained by incorporating in the monomer solution from about 1 to about 8 percent of an alkali metal chloride and thereafter polymerizing by conventional catalytic means.

BACKGROUND OF THE INVENTION

The present invention concerns an improvement in a process for the solution polymerization of acrylic monomers. The invention is more particularly directed to enhancing the polymerization rate of such monomers.

It is well known that acrylic monomers such as acrylic acid, acrylamide and related salts and derivatives of such monomers can be polymerized in aqueous solution to provide high molecular weight polymers. These polymers have been demonstrated to be excellent flocculants for use in the mining and water treating industries.

It is a characteristic of the solution polymerization technique that the reaction vessels have a fluid capacity several times that of the volume of polymer to be prepared inasmuch as the monomer charge to the aqueous system, and thus polymer formed therein, will usually fall within a range from about 10 to 30 percent by weight of the total system. The higher the molecular weight desired, the less will be the amount of catalyst used with resultingly longer reaction times. As a consequence, polymerization cycles usually require from 4 up to as much as 10 hours or more.

It is manifest from the foregoing, that a faster polymerization reaction and thereby increased plant capacity for the manufacture of high molecular weight acrylic polymers would be highly desirable. Most efficacious would be a polymerization process in which the faster polymerization rates are attained and equivalent, or even higher molecular weights, are achieved relative to the products of the unmodified process. These benefits and other objects as will become apparent hereinafter, are achieved in accordance with the present invention.

In a particular embodiment of the invention, water-soluble acrylic monomer is polymerized in aqueous solution having dissolved therein from about 10 percent, based on the weight of the monomer, of a water-soluble alkali metal sulfate, or at least about 1 percent of a water-soluble alkali metal chloride, same basis. An amount of either salt sufficient to saturate the monomer system may be used if desired. Usually the amount of salt will not exceed about 100% based on the weight of monomer. For best results in preparing soluble, high molecular weight polymers the amount of monomer will range from about 5 up to about 35 percent by weight of the polymerization system, i.e., the salt free mixture of monomer and water. It is preferred to use an alkali metal chloride such as sodium chloride, which is added in an amount from about 1 up to about 8 percent, based on the weight of the monomer present in the polymerization system. Among other acid salts that can be used for this purpose, the chlorides are unique in that they will not react to form insoluble precipitates with hardness ions in applicating solutions of the polymer.

Polymerization of the monomer is accomplished by reducing the oxygen content of the monomer solution and subjecting the system to a catalyst for polymerizing unsaturated monomer in aqueous media. The polymerization temperature should be within the range from about 0 up to 100° C. or so. Preferably, the temperature is within the range of about 5 up to about 50° C. Polymerization may be conducted under any pressure desired so long as the pressure is sufficient to maintain a liquid polymerization system. Oxygen is removed from the monomer system as by purging with an essentially oxygen free gas, evacuating the reaction vessel, or any other convenient method for reducing the free oxygen content of an aqueous monomer system.

The catalyst applied may be any of the known catalytic means for initiating polymerization of unsaturated groups. Suitable catalyst systems include high energy ionizing radiation, actinic light, or chemical free radical catalysts effective in aqueous systems. Of the latter type are the various oxygen containing catalysts such as tertiarybutyl hydroperoxide, hydrogen, peroxide, benzoyl peroxide, sodium persulfate, potassium percarbonate, sodium chlorate, sodium perborate, ammonium perborate and the like. Redox-systems comprising both an oxygen containing compound and a reducing agent are particularly desirable. Such systems are illustrated by sodium persulfate/sodium bisulfite and potassium persulfate/potassium bisulfite.

The amount of catalyst used should be sufficient to achieve initiation of the reaction. Usually this can be accomplished in a system essentially free of oxygen with as little as 0.0005 percent by weight of the catalyst based on the weight of the monomer. Up to as much as 1 or more percent by weight of the catalyst may be used, based on the weight of the monomer. Preferably, however, high molecular weight polymers will be prepared in the essential absence of free oxygen utilizing from about .001% up to about 0.4% by weight of the catalyst, based on the weight of monomer.

Acrylic monomers that may be polymerized or copolymerized according to the invention include acrylamide, acrylic acid, sodium acrylate, and in general any water-soluble monomer of the formula

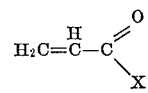

wherein X is a NH$_2$ or OM group, M being hydrogen, alkali metal or water-soluble monovalent ammonium cation.

Optionally small amounts of other monomers copolymerizable with the acrylic monomer can be incorporated in the polymerization system without diminishing the benefits of the enhanced polymerization rate according to the invention.

Other ingredients which may be used include various amounts of alkali or alkaline earth metal carbonates or hydroxides incorporated into the monomer charge to achieve hydrolysis and/or neutralization of the monomer charge. Still other optional modifications of the polymerization include incorporation of chain transfer agents, accelerators and in general any of the special additives which may be added to the polymerization system for a particular purpose.

The polymerizate obtained in accordance with the instant invention can be employed directly in the preparation of applicating solutions of the polymer. That is, the polymer gel can be dispersed and dissolved in additional water to prepare conveniently fluid solutions of the polymer.

Alternately the polymer solids may be recovered from the polymerizates as by solvent precipitation or drying. For instance, the polymer can be precipitated by the addition of an organic solvent to the polymerizate and solid polymer recovered by filtration. Drying of the polymerizate can be accomplished by passing the polymerizate onto belt or drum dryers to prepare a particulate solid polymeric product from which substantially all of the water has been removed.

The enhancement of the polymerization rate in accordance with the invention is illustrated in the following examples.

EXAMPLES 1-7

A water solution containing 5 percent acrylamide monomer was charged in the amount of 50 cc. to a 4 ounce round bottle. The monomer charged was purged with nitrogen and as the purging continued, the bottle was heated at a controlled temperature in a heating mantle. To the monomer charge was added 0.03 percent by weight potassium persulfate and 0.005 percent by weight 2-mercapto ethanol. A small amount of tetrasodium salt of ethylenediaminetetraacetic acid was also added to inactivate a metal inhibitor previously incorporated into the monomer system.

Subsequent runs were carried out in a manner identical to that described above except that a given amount of sodium sulfate was added to the system in each run.

Measurements made during each run included the initial and maximum polymerization temperatures, the time required for the polymerization charge to achieve the incremental temperature increase to maximum yields, the rate of heating of the polymerization system as a result of the exothermic heat of reaction. An increased rate of temperature rise reflects a faster polymerization reaction. The viscosity of a solution of 0.5 percent by weight of polymer in water was also measured. This yields a basis for comparing relative molecular weights of the polymers.

The results of the above runs, as well as further comparative runs at 30 percent acrylamide monomer concentration using sodium sulfate as the salt additive are set forth in the following table.

measured for duplicate runs. With this data an average polymerization rate in ° C. per minute for the first 5 minutes of the reaction was determined. The averaged results of these experiments, run in duplicate, are reported in the following Table II.

TABLE II

| Example No. | Percent salt | Min. to rise, 5° C. | ° C./min. |
| --- | --- | --- | --- |
| 9 | 0 NaCl | 9.5 | 0.528 |
| 10 | 1 NaCl | 7 | 0.778 |

It is apparent from the foregoing that even small amounts of the sodium chloride additive has a significant effect on the polymerization rate of the acrylic monomer. It is also apparent that the improved polymerization rate in Examples 9 and 10 would permit the production of much more polymer than could be prepared at the slower polymerization rate, assuming the reactor is on stream essentially full time.

In a manner similar to the foregoing, enhanced polymerization rates are achieved in the copolymerization of acrylamide and acrylic acid, as well as the polymerization of these monomers, with or without the optional inclusion in the monomer charge of small amounts, e.g. up to about 30 percent by weight, based on the monomer charge, of monomers copolymerizable with either acrylamide or acrylic acid such as N-methyl acrylamide, N-propyl, acrylamide, styrene sulfonate, sodium methacrylate, vinyl acetate, acrylonitrile, aminoethyl acrylate, N - aminoethyl acrylamide, vinylpyridine, vinylpyrrolidone, vinyloxyzolidinone, vinylmorpholinone, vinylbenzyltrimethyl ammonium chloride and the like.

Improved polymerization rates are also achieved by using amounts of the salts employed in the above examples up to the amount of salt required to saturate the polymerization system. Amounts in excess of the saturation limit will be present as dispersed solids in the solution polymerization system. The amount of salt that will saturated the system, will of course, vary with the monomer concentration and the particular salt used. Illustratively, a water solution of 5 percent acrylamide at 25° C. will contain at saturation 380 percent sodium sulfate,

TABLE I

| Example No. | Percent Acrylamide | Percent Salt | ° C. Start | ° C. Max. | Reaction time (min.) | Rate, ° C./min. | ½% viscosity (cps.) |
| --- | --- | --- | --- | --- | --- | --- | --- |
| 1 | 5 | 0 Na₂SO₄ | 65 | 72 | 41 | 0.171 | 5.2 |
| 2 | 5 | 20 Na₂SO₄ | 65 | 72.5 | 21 | 0.356 | 5.13 |
| 3 | 30 | 0 Na₂SO₄ | 45 | 98.5 | 24 | 2.23 | 7.35 |
| 4 | 30 | 20 Na₂SO₄ | 45 | 101.0 | 12 | 4.67 | 9.12 |
| 5 | 30 | 0 NaCl | 45 | 98.5 | 24 | 2.23 | 7.35 |
| 6 | 30 | 2 NaCl | 45 | 99.0 | 23 | 2.35 | 7.46 |
| 7 | 30 | 20 NaCl | 45 | 99.0 | 20 | 2.70 | 8.94 |

EXAMPLE 8

Similar to the above polymerization, an aqueous solution containing 31.6 percent by weight acrylamide was polymerized in the presence of a saturated solution of sodium sulfate. Within comparable periods of time, the polymerizate without salt increased a total of 40.5° C. While that saturated with sodium sulfate increased by 67° C. The latter system also produced polymer of slightly higher molecular weight as evidenced by its solution viscosity.

EXAMPLES 9-10

In a manner similar to that of the above examples, a water solution containing 5 percent by weight acrylic acid was polymerized in the presence of 0.04 percent by weight potassium persulfate. Also added was 0.01 percent 2-mercapto ethanol, 0.01 percent by weight of the chelating agent used in Example 1, and 2 percent sulfonated castor oil as a drying roll release agent.

In a comparative series, runs were made with and without a salt additive. Sodium chloride was the salt additive used. It was employed in the amount of 1 percent by weight based on the weight of the monomer. The time for the polymerization charge to rise 5° C. was based on the monomer, or 80 percent sodium sulfate, total solids basis. At 35 percent monomer, the amount of sodium sulfate at saturations is 15.7 percent based on the monomer, or 13.6 percent based on a total solids.

What is claimed is:

1. A method which comprises polymerizing an acrylic monomer in aqueous solution having from about 5 up to about 35 percent by weight of the monomer, based on the weight of the polymerization system, said solution having dissolved therein from about 1 percent up to about 8 percent by weight, based on the weight of the monomer, of an alkali metal chloride, and polymerizing the acrylic monomer in the essential absence of oxygen whereby a water-soluble polymer is obtained at an enhanced rate of polymerization.

2. A method as in claim 1 wherein the acrylic monomer is polymerized by subjecting the polymerization system to a temperature within the range from 0 up to 100° C. and a free radical catalyst.

3. A method as in claim 2 wherein the free radical catalyst is an oxygen containing free radical chemical catalyst and the amount used is from about 0.001 up to about 0.4 percent by weight, based on the monomer.

4. A method as in claim 3 wherein the acrylic monomer is acrylamide and the alkali metal chloride is sodium chloride.

5. A method as in claim 3 wherein the acrylic monomer is acrylic acid and the alkali metal chloride is sodium chloride.

References Cited
UNITED STATES PATENTS

| | | |
|---|---|---|
| 2,326,078 | 8/1943 | Trommsdorff. |
| 2,789,099 | 4/1957 | Rife. |
| 2,810,716 | 10/1957 | Markus. |
| 3,405,106 | 10/1968 | Scanley _____ 260—80 |
| 3,414,552 | 12/1968 | Scanley _____ 260—89.7 |

FOREIGN PATENTS 720,460  10/1965  Canada.

JOSEPH L. SCHOFER, Primary Examiner

C. A. HENDERSON, Jr., Assistant Examiner

U.S. Cl. X.R.

260—66, 79.7, 80.3, 85.5, 85.7, 89.7